UNITED STATES PATENT OFFICE.

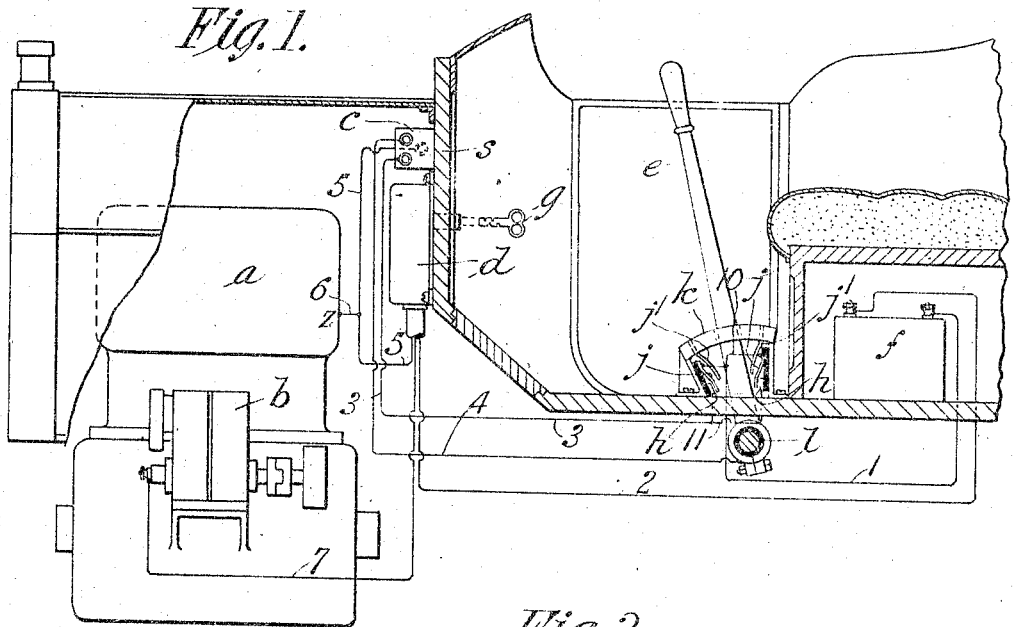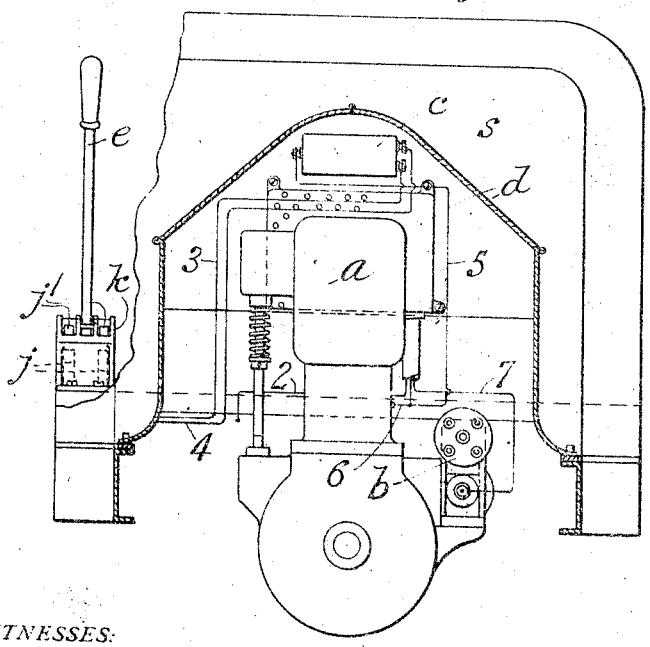

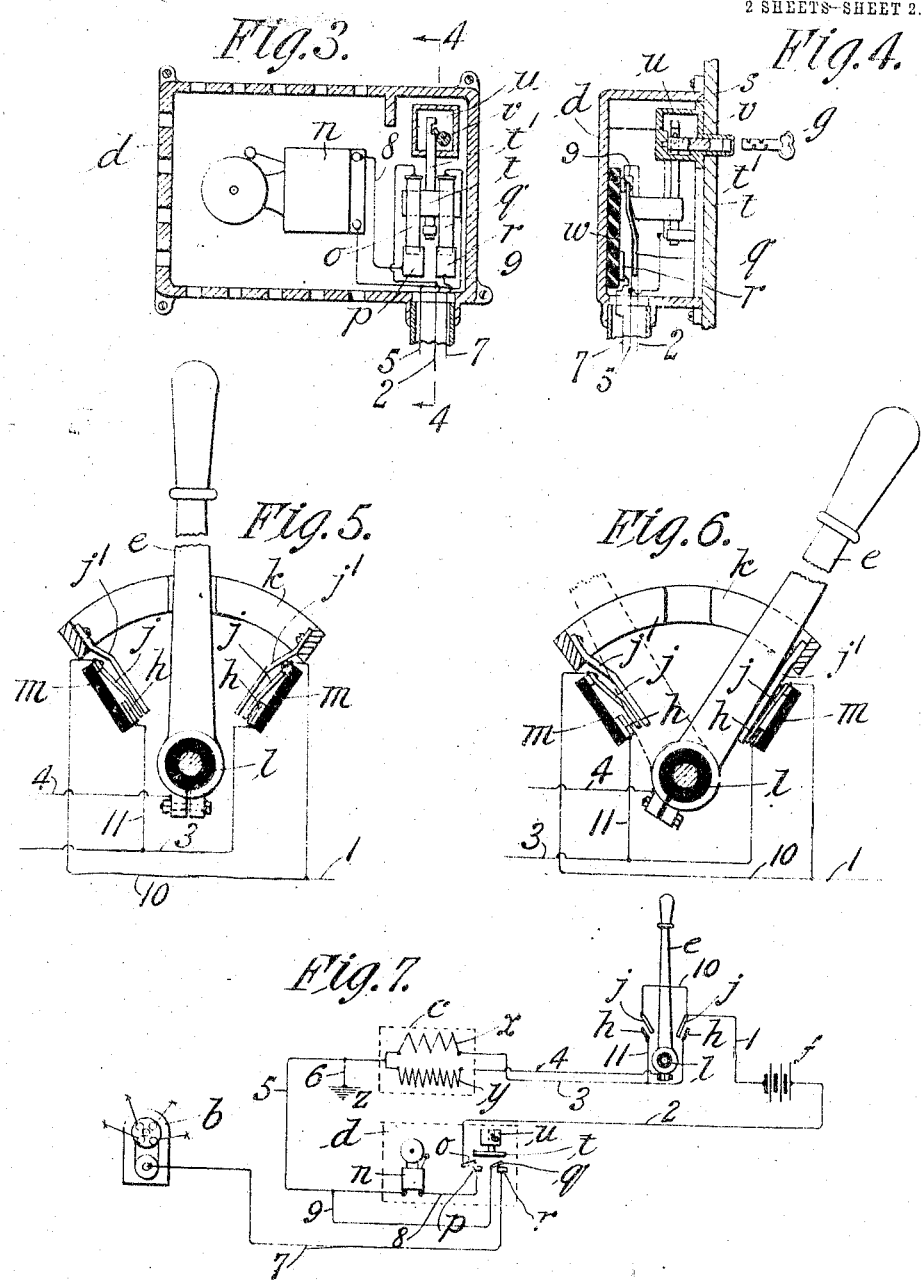

OLIVER A. SMITH, OF SPRINGFIELD, MASSACHUSETTS, ASSIGNOR OF ONE-HALF TO GEORGE A. RUSSELL, OF SPRINGFIELD, MASSACHUSETTS.

APPARATUS FOR SAFEGUARDING AUTOMOBILES FROM THEFT.

1,132,128.

Specification of Letters Patent.

Patented Mar. 16, 1915.

Application filed May 12, 1913. Serial No. 767,089.

*To all whom it may concern:*

Be it known that I, OLIVER A. SMITH, a citizen of the United States of America, and resident of Springfield, in the county of Hampden and State of Massachusetts, have invented certain new and useful Improvements in Apparatuses for Safeguarding Automobiles from Theft, of which the following is a full, clear, and exact description.

This invention relates to means provided on an automobile, the object of which is to insure, in case a dishonest or unauthorized person attempts to start the machine through the usual controlling lever or member, the giving of a shock to such person which will act as a deterrent against his further wrongful efforts.

A further object of the invention is to provide instrumentalities for the purpose above set forth which largely are stock parts or devices or instruments of commerce so that in the carrying out of my invention very little in the nature of special equipment is required.

The invention is described in conjunction with the accompanying drawings and is defined in the claims.

In the drawings:—Figure 1 is a partial longitudinal section of the forward part of an automobile having contrivances of the present invention provided thereon. Fig. 2 is a partial front elevation of an automobile with the improved devices shown thereon. Fig. 3 is a longitudinal section through the box or inclosure in which the lock device and the bell or audible alarm are contained, Fig. 4 being a cross section through the same taken on a plane at right angles to that on which Fig. 3 is taken and as indicated by the section line 4—4. Fig. 5 is a view in detail showing the gear shifting lever and the quadrant appurtenant thereto and showing the electrical connections to be established thereby. In this view the lever is shown as in its neutral position. Fig. 6 is a view similar to Fig. 5 except that the lever is shown in its position for throwing in the "low gear". Fig. 7 is a view diagrammatically illustrative of the entire novel apparatus.

Similar characters of reference indicate corresponding parts in all of the views.

Referring to the drawings, $a$ represents the engine, $b$ the magneto, $c$ an induction coil, $d$ the lock and bell box, $e$ the gear shifting lever, $f$ a small battery, $g$ a key carried by the authorized operator of the car, $h$ one of the contacts operated by the gear lever, $j$ the other contact operated by the gear lever, $j'$ a leather strip which acts as a guard for contact $j$, $k$ the quadrant for the gear lever, $l$ a ring of insulation which serves to insulate the gear shifting lever from its shaft and incidentally from any contact with the frame of the car.

$m$ is a block of insulation on which is mounted the contacts $h$ and $j$.

$n$ is an alarm bell; $o$, $p$, $q$, and $r$ represent electrical contacts, $s$ the dash board of car; $t$ is a shoe, preferably of insulation which presses contacts $o$ and $q$ against contacts $p$ and $r$ when key $g$ is turned by operator; $t'$ is a bolt to which the shoe $t$ is attached; $u$ represents the lock itself, $v$ a shaft which when turned by the key $g$ operates the bolt $t'$ up or down as the case may be.

$w$ is a block of insulation on which is mounted contacts $o$, $p$, $q$ and $r;$ $x$ is the primary winding of induction coil $c;$ $y$ is the secondary winding of induction coil $c;$ $z$ represents a ground connection attached to any convenient part of the frame, engine, etc.

1 is a wire connecting the positive terminal of battery $f$ with one of the contacts $j;$ 2 is a wire connecting the negative terminal of battery $f$ with contact $o$ in lock box $d;$ 3 is a wire connecting one of the contacts $h$ with one end of primary coil $x;$ 4 is a wire connecting the gear shifting lever $e$ with one end of secondary coils $y;$ 5 is a wire connecting the other ends of both the primary and secondary coils with positive terminals of the alarm bell $n;$ 6 is a ground wire connecting wire 5 with the frame of the car at $z;$ 7 is a wire connecting the contact $r$ in the lock box $d$ with the ground terminal of the magneto $b;$ 8 is a wire connecting connecting contact $p$ in lock box $d$ with negative terminal of alarm bell $n;$ 9 is a ground wire connecting contact $q$ in lock box $d$ with frame of car $z;$ 10 is a wire connecting one of the contacts $j$ with the other contacts $j';$ 11 is a wire connecting wire 3 with the other contacts $h$.

The operation of the device is as follows: As stated, the operator of the car carries a key which may be of any shape or style which fits into the cylinder of the lock $u$. When operator is running the car the lock can be said to be in an unlocked position which separates the electrical contacts $o$ and $q$ from contacts $p$ and $r$ which makes the device inoperative for the time being while car is being run. If the operator leaves the car for any length of time he turns the key in the lock $u$ which at once establishes an electrical connection between contacts $o$ and $q$ with contacts $p$ and $r$. The gear shift lever if left in neutral position which is customary practice. If, while the operator is absent, any unauthorized person attempts to steal the car, he first starts the engine unless it was left running by the operator, and then proceeds to place the gear shifting lever $e$ in either low or reverse position. It might be mentioned here that although as shown only for the low and reverse positions on the quadrant $k$, the contacts $h$ and $j$ could be so made as to be closed if the lever $e$ was placed in either intermediate or high positions on the quadrant. Therefore, placing the lever $e$ in any position except neutral, will close the contact between $h$ and $j$ which establishes a complete circuit and the device acts at once.

Referring to the wiring diagram, Fig. 7, when the lever $e$ is placed in any position except neutral, the contact between $j$ and $h$ is established and the current from the battery $f$ flows through wire 1 to contact $j$ and then to contact $h$ through wire 3 to primary coil $x$, through coil $x$, through wire 5 to bell $n$, through the bell which rings and sounds the alarm, then through wire 8 to contact $p$, then to contact $o$, then through wire 2 back to the negative terminal of the battery $f$. As the current flows through the primary coil $x$, it induces a high tension current in the secondary coil $y$ which flows through wire 4 to the lever $e$. As the lever $e$ is grasped by the hand of the party wishing to start the car, the high tension current will pass through his body and then to the frame of the car and from there back through the ground wire 6 and part of wire 5 to the negative terminal of the secondary coil $y$. This will give a severe shock to the aforesaid party. At the same time as the contact between $q$ and $r$ is closed the magneto $b$ is grounded through wire 7, contacts $r$ and $q$, ground wire 9 to ground on the frame at $Z$. This will stop the engine $a$, or prevent its running.

The cover $d$ over the bell $n$ and the lock $u$ is perforated so the ringing of the bell will be more plainly heard. The perforations are not large enough to enable any one to harm either the bell or the lock mechanism.

The lock and bell mechanism is in a box $d$ as before stated, and is preferably located under the foot board or on the back of the dash S with the sleeve of the lock $u$ projecting through either the dash or the foot board to enable the operator to lock or unlock the mechanism with his key $g$. The induction coil box C is located near to the lock and bell box $d$. The battery $f$ is placed in any convenient place.

On an automobile of the older manufacture, the generator comprised in the ignition system might instead of a magneto be substituted by what is to be herein regarded as the known equivalent thereof, that is a coil box operatively dependent on a battery, and the same may be rendered ineffective in substantially the same manner and by the employment of the same means as herein described and in conjunction with the magneto shown. And, of course, if the car is equipped with both magneto and battery, the wiring 7 could be in connection with both the magneto and coil box so that whichever system is switched in will, under the operation of the key controlled devices, be short circuited or rendered ineffective as manifest.

It is to be understood that the several circuit closing members or switches comprised in the apparatus substantially as described are to be composed of spring metallic devices operative by reason of their resiliency, to be sprung to their opened positions when permitted so to do.

Although this invention has been primarily conceived of for utilization on an automobile equipped with an explosion engine, its transportation for equivalent effect to a motor boat would be entirely manifest; and under certain aspects of the invention it is available for the prevention of the operation of any explosive engine, including an ignition system employed in any situation.

I claim:—

1. In an apparatus of the character described, a primary circuit having openings in two portions thereof and including a generator and primary and secondary coils, key actuated means closing the circuit in one of the normally open portions thereof, and an action controlling member which when moved for establishing driving conditions of the vehicle is operative to close the said circuit in the other open portion thereof, and which action controlling member has connection with the secondary coil so that when the primary circuit is closed the current from the secondary coil, connected with said action controlling member will pass through and impart a shock to a person attempting through said action controlling member to establish propulsive conditions for the vehicle.

2. In an apparatus of the character described, an action controlling lever for establishing driving conditions for the vehicle, contacts adjacent and at opposite positions relatively thereto and switch members coöperative with the lever and with said contacts, a circuit comprising a generator and having connection with both said switch members, portions thereof having connections with said contacts, and said circuit also having an opening therein at another portion thereof, and key controlled means for closing such opening in the circuit,—said circuit also comprising a primary and a secondary coil which latter is electrically connected with the said action controlling lever and with both of the said contacts adjacent such lever.

3. In an apparatus of the character described, an action controlling lever for establishing driving conditions for the vehicle, contacts adjacent and at opposite positions relatively thereto and switch members coöperative with the lever and with said contacts, a circuit comprising a generator and having connection with both said switch members, portions thereof having connections with said contacts, and said circuit also having an opening therein at another portion thereof, and key controlled means for closing such opening in the circuit,—said circuit also comprising a primary and a secondary coil, which latter is electrically connected with the said action controlling lever.

Signed by me at Springfield, Mass., in presence of two subscribing witnesses.

OLIVER A. SMITH.

Witnesses:
  Wm. S. Bellows,
  G. R. Driscoll.